United States Patent
Brockhaus et al.

(10) Patent No.: US 9,200,933 B2
(45) Date of Patent: Dec. 1, 2015

(54) MAGNETO-INDUCTIVE FLOWMETER HAVING A FUNCTIONAL UNIT WITH A REQUEST INITIATOR ACTIVATED BY A USER OR THE FLOWMETER

(71) Applicant: KROHNE Messtechnik GmbH, Duisburg (DE)

(72) Inventors: Helmut Brockhaus, Oberhausen (DE); Wilhelm Florin, Duisburg (DE)

(73) Assignee: Krohne Messtechnik GmbH, Duisburg (DE)

( * ) Notice: Subject to any disclaimer, the term of this patent is extended or adjusted under 35 U.S.C. 154(b) by 30 days.

(21) Appl. No.: 14/325,512

(22) Filed: Jul. 8, 2014

(65) Prior Publication Data
US 2015/0007670 A1    Jan. 8, 2015

(30) Foreign Application Priority Data

Jul. 8, 2013 (DE) .......................... 10 2013 011 290
Aug. 24, 2013 (DE) .......................... 10 2013 013 991

(51) Int. Cl.
*G01F 1/58* (2006.01)
*G01F 25/00* (2006.01)
*G01F 15/06* (2006.01)

(52) U.S. Cl.
CPC ................ *G01F 1/58* (2013.01); *G01F 15/063* (2013.01); *G01F 25/0007* (2013.01)

(58) Field of Classification Search
None
See application file for complete search history.

(56) References Cited

U.S. PATENT DOCUMENTS

| 6,804,613 | B2 | 10/2004 | Ishikawa et al. |
| 7,149,701 | B2* | 12/2006 | McKinney ..... G06Q 10/063114 705/7.15 |
| 8,033,183 | B2 | 10/2011 | Reichart et al. |
| 2005/0126305 | A1 | 6/2005 | Schulz et al. |
| 2007/0106525 | A1* | 5/2007 | McKinney ............. G06Q 10/06 705/7.41 |
| 2007/0106527 | A1* | 5/2007 | McKinney ............. G06Q 10/06 705/7.41 |
| 2009/0319314 | A1* | 12/2009 | Good ..................... G06Q 20/10 705/329 |
| 2010/0107776 | A1 | 5/2010 | Shanahan |
| 2013/0006544 | A1 | 1/2013 | Rovner |
| 2013/0166454 | A1* | 6/2013 | Bulawa ................ G06Q 20/102 705/44 |

FOREIGN PATENT DOCUMENTS

| DE | 692 32 633 T2 | 9/2002 |
| DE | 102 43 748 A1 | 4/2003 |
| DE | 102 08 258 A1 | 9/2003 |
| EP | 0 704 682 A2 | 4/1996 |
| EP | 1933116 A2 | 6/2008 |
| WO | 2013023947 A1 | 2/2013 |

* cited by examiner

*Primary Examiner* — Harshad R Patel
(74) *Attorney, Agent, or Firm* — Roberts Mlotkowski Safran & Cole, PC

(57) ABSTRACT

A magneto-inductive flowmeter having at least one measuring tube for the flow of an electrically conducting medium, having at least one magnetic field generator for generating a preferably alternating magnetic field running at least also perpendicular to the longitudinal axis of the measuring tube, having at least two measuring electrodes—in particular in contact with the medium—and having a functional unit containing at least one evaluation unit and a method of operating same. The magneto-inductive flowmeter is user-friendly in a very particular manner, namely in that the functional unit has a request initiator that can be activated—by the user or the flowmeter itself—, a contacting receiver and an information sender and that by the request initiator, a third party can be prompted—by the user or the flowmeter itself—into contact—with the user or with the flowmeter itself.

8 Claims, 1 Drawing Sheet

MAGNETO-INDUCTIVE FLOWMETER HAVING A FUNCTIONAL UNIT WITH A REQUEST INITIATOR ACTIVATED BY A USER OR THE FLOWMETER

BACKGROUND OF THE INVENTION

1. Field of the Invention

The invention relates to a magneto-inductive flowmeter having at least one measuring tube for the flow of an electrically conducting medium, having at least one magnetic field generator for generating a preferably alternating magnetic field running at least also perpendicular to the longitudinal axis of the measuring tube, having at least two measuring electrodes—in particular in contact with the medium—and having a functional unit containing at least one evaluation unit.

2. Description of Related Art

Magneto-inductive flowmeters have been known extensively in the prior art for decades. As an example, reference is made here to the citation "Technische Durchflussmessung" by professor Dr.-Ing. K. W. Bonfig, $3^{rd}$ Edition, Vulkan-Verlag, Essen, pages 123 to 167 and to the citation "Grundlagen Magnetisch-Induktive Durchflussmessung" by Dipl.-Ing. Friedrich Hoffmann, $3^{rd}$ Edition, 2003, publication of the company KROHNE Messtechnik GmbH & Co. KG.

The basic principle of a magneto-inductive flowmeter for flow measurement of a flowing medium is traced back to Michael Faraday, who already proposed, in 1832, the use of the principle of electromagnetic induction for measuring the flow velocity of an electrically conductive medium.

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magneto-inductive flowmeters in that a magnetic field fluctuating over time during the measurement process is generated by means of a magnetic field generator having at least one magnetic field coil, normally two magnetic field coils, and the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

If it is mentioned above that the magneto-inductive flowmeter being discussed here has at least one magnetic field generator "for generating a magnetic field running perpendicular to the longitudinal axis of the measuring tube", then it should be mentioned here that the magnetic field preferably runs perpendicular to the longitudinal axis of the measuring tube or perpendicular to the direction of flow of the medium, however, it is sufficient when a component of the magnetic field runs perpendicular to the longitudinal axis of the measuring tube or perpendicular to the direction of flow of the medium.

It is described above, that the magnetic field generator is specified for generating a preferably alternating magnetic field. This expresses that it is not of importance for the teaching of the invention—according to its origin, according to the underlying object and according to the solution of this object—that there is an alternating magnetic field, even if, for the most part, magneto-inductive flowmeters have magnetic field generators that generate an alternating magnetic field.

It is also described above that the magneto-inductive flowmeter being discussed here also has at least two measuring electrodes—in particular contacting the medium. These measuring electrodes are used for tapping a measuring voltage induced in a flowing medium. Preferably, the virtual connection line of the of the two measuring electrodes runs essentially perpendicular to the direction of the magnetic field interfusing the measuring tube perpendicular to the longitudinal axis of the measuring tube. In particular, the measuring electrodes can be provided in such a manner that their virtual connection line actually runs—more or less—perpendicular to the direction of the magnetic field interfusing the measuring tube.

Finally, it is described above that the measuring electrodes are, in particular, such that they come into contact with the medium. Indeed, of course, the electric field strength generated by induction in the flowing, electrically conductive medium can be tapped by direct, i.e., galvanic measuring electrodes in contact with the medium as a measuring voltage. However, there are magneto-inductive flowmeters in which the measuring voltage is not tapped by direct, i.e., non-galvanic, measuring electrodes in contact with the medium, rather the measuring voltage is capacitively determined.

The primary use of magneto-inductive flowmeters of the type being discussed here is naturally the measurement of the flow of a medium through a measuring tube, namely a medium that has at least a low electric conductivity, i.e., flow measurement. However, the use of magneto-inductive flowmeters is not limited only to this use. Magneto-inductive flowmeters, which are also specified and suitable for conductivity measurement, are known, for example, from the translation of the European patent 0 704 682, German Patent DE 692 32 633 C2, as well as from the publication of German applications DE 102 43 748 A1 (which corresponds to U.S. Pat. No. 6,804,613) and 10 208 258 A1.

That magneto-inductive flowmeters can be specified and suitable for conductivity measurement is only mentioned above as an example that the use of magneto-inductive flowmeters is not limited only to use in flow measurement. Nevertheless, however, magneto-inductive flowmeters are used for a very large spectrum of uses in flow measurement and modern functional units in magneto-inductive flowmeters can cover these uses. Admittedly, parameterization is necessary for different uses—in particular because measuring conditions can be very diverse, for example constant flow or pulsing flow depending on the type of pump, few disrupted measuring voltages at the measuring electrodes due to a high conductivity of the medium, whose flow is to be measured, and a clean, pure liquid (e.g., in the chemical industry) as medium or a pulpy medium in the measuring tube having a changing pH and changing conductivity (e.g., in the paper industry) or hydraulic transport of sand in a sand-water mixture or cooling water as a medium with a mixture of air bubbles and dissolved deposits (in the production of steel), measurement over a long period of time (days, weeks or even months) for determining and possibly deducting volume flows, or in a range of seconds for dispensing exact volumes, or in a range of minutes for filling containers or for precisely regulating the flow at a desired value, very different nominal widths, nominal widths in a range of a few millimeters to a range of several meters, measurements in a pump station, far away from further industrial systems or measurements close to inductive smelting furnaces with extreme magnetic fields or measurements in galvanic processes with high electrical currents of more than 10 kA over the medium in the measuring tube or measurements in piping systems with corrosion prevention due to a voltage increase in the medium as opposed to ground potential.

This is only an exemplary list of different uses that require different parameterizations in order to be able to obtain sufficiently exact and sufficiently stable measuring values even in a very short time.

Since there are a plurality of different tasks, measuring principles and producers in the field of measuring technology, experts among the users are no longer readily capable of carrying out the necessary different parameterizations without ado. It is not known to the producers when they deliver their measuring devices, where and how they will be used, so that parameterization by the producer cannot easily satisfy all requirements and dispatching special producer lists at the measuring locations only makes economic sense in exceptional cases.

SUMMARY OF THE INVENTION

Based on the above-described situation, the primary object of the present invention is to provide a magneto-inductive flowmeter that is user-friendly in a very particular manner.

The magneto-inductive flowmeter according to the invention, in which the above derived and shown object is met, is initially and essentially wherein the functional unit has a request initiator that can be activated—by the user or the flowmeter itself—, a contacting receiver and an information sender and that by means of the request initiator, a third party can be prompted—by the user or the flowmeter itself—into contact—with the user or with the flowmeter itself. This warrants clarification:

For the first alternative, it is assumed that the user has a magneto-inductive flowmeter that he would like to employ or he is already employing and that has already been factory set for a certain use, but could be used for other applications if the essential, factory-set parameters for that function could be changed. Such a change is possible in the magneto-inductive flowmeter according to the invention, without requiring a specialist from the producer to make changes in the settings, i.e., parameters, of the magneto-inductive flowmeter in question "on site".

If the user of a magneto-inductive flowmeter according to the invention wants to implement possible, but not active, settings on this flowmeter, he is to initially activate the request initiator provided in the functional unit of the magneto-inductive flowmeter according to the invention. A third party is prompted by the user to make contact with the user by means of the activated request initiator. The third party can be the producer of the magneto-inductive flowmeter according to the invention, however, the third party can also be, for example, a service site of the producer of the magneto-inductive flowmeter. Finally, the third party can also be an "assistance function", implemented by the producer, by a service site of the producer or even in the software of the flowmeter itself. The third party prompted to contact by the user by means of the request initiator can then come into contact, in particular start a dialog, with the user of the magneto-inductive flowmeter according to the invention and/or the flowmeter according to the invention itself.

It is assumed for a second alternative, that the functional unit has a request initiator that can be activated by the flowmeter itself, a contacting receiver and an information sender and that by means of the request initiator, a third party is prompted—in the sense described above—by the flowmeter itself to come into contact with the flowmeter itself. In this alternative, communication takes place within the flowmeter.

Magneto-inductive flowmeters are known, in which the user can directly and immediately activate a self-test, i.e., even in the correspondingly equipped magneto-inductive flowmeter,—with the result, that after carrying out the self-test, parameterizations resulting therefrom are carried out by the correspondingly equipped magneto-inductive flowmeter itself. The possibilities of the magneto-inductive flowmeter according to the invention, however, go far and beyond what is known in the prior art.

In a particularly preferred embodiment of the magneto-inductive flowmeter according to the invention, the functional unit has a self-test unit and a parameter-setting unit, wherein the third party can activate the self-test after the request for contact coming from the user, optionally—before or after activation of the self-test unit—the third party can also confirm contact to the user. The self-test present in this embodiment of the magneto-inductive flowmeter according to the invention can be used for analysis of the measured course of the measuring voltage over time, analysis of the measured voltage at the magnet coils and the measured current in the magnet coils over time, analysis of the calculated flow value over time, analysis of the course of the measuring voltage using a Fourier transformation in the frequency range, analysis of the measured impedances of the measuring electrodes, analysis of the measured profile of the flow of the medium, analysis of the measured linearity, analysis of the calculated temperature of the magnet coils.

If the magneto-inductive flowmeter according to the invention is the particularly preferred embodiment described further above, in which the functional unit has a self-test unit and a parameter-setting unit, and is further the second alternative described above, in which the functional unit has a request initiator that can be activated by the flowmeter itself, then this is an embodiment—self-sufficient, so to speak—in which parameterization can be carried out independently with the help of the self-test unit. This particularly preferred embodiment is such that it is wherein the functional unit has a self-test unit and a parameter-setting unit and that the self-test unit can independently carry out parameterization. For example, in one embodiment of the magneto-inductive flowmeter according to the invention, which is specified and suitable for conductivity measurement, the self-test unit carries out the conductivity measurement and, depending on the determined conductivity, a calibration factor corresponding to the determined conductivity is implemented as parameter.

A further preferred embodiment of a magneto-inductive flowmeter according to the invention is—alternatively or cumulatively—wherein after a request for contact coming from the user or the flowmeter itself, the third party confirms contact and the user or the flowmeter itself can request exchange of information and that, after a request for exchange of information coming from the third party, the user or the flowmeter itself can influence the received information corresponding to the magneto-inductive flowmeter. In particular, parameterization of the magneto-inductive flowmeter according to the invention can be carried out with this influencing of the magneto-inductive flowmeter, for example, the following:

Field frequency: the frequency at which the magnetic field is switched,

Engaging phase: the time it takes after switching the magnetic field until the tapped measuring voltage is evaluated for flow measurement, Time constant: the tapped measuring voltages are filtered using a low-pass filter, so that noise is reduced, Pulse filter: erratic disturbances, which cannot be traced back to changes in flow, are filtered by a pulse filter, Pulse width: a certain pulse width is used by the pulse filter for differentiating between changes in flow and disturbances, pulse-like signals below the pulse width are recognized as a disturbance, Noise filter: a small change of the flow is more strongly damped by a noise filter than a large change in flow using a noise filter, Noise level: an amplitude is used for differentiating between noise and change in flow, below a certain value of the amplitude, a change of flow is interpreted as being noise and is more strongly damped, Idling detection: a certain method is chosen for detecting idling, Limiting value: a limit is set for recognizing an empty measuring tube.

In the embodiment described last of the magneto-inductive flowmeter according to the invention, the third party—for example the producer or a service site of the producer or even an "assistance-function", implemented by the producer or even in the software of the flowmeter itself—can request the user or the flowmeter itself for information exchange after he/it has been prompted into contact with the user or the flowmeter itself by means of the request intiator from the user or from the flowmeter itself, i.e., he can direct questions directly to the user or to the flowmeter, for example:

Is it necessary to have a quick reaction time of the flowmeter below a time constant of three seconds?

Is the measuring tube filled with the medium, whose flow is to be measured?

Is it expected to see fluctuations in the medium, whose flow is to be measured?

Since, as already described, there is a large spectrum of applications for magneto-inductive flowmeters, there are so-called application classifications, for example:

quick filling,
pulsing flow,
air or solid embeddings,
very high solids ratio (slurry or hydraulic transport),
low conductivity,
flow profile fluctuations,
idling in the measuring tube during operation.

With the help of the magneto-inductive flowmeter according to the invention, parameterizations required for the individual application classifications can also be set—incidentally, in the manner described above, i.e., the application classifications are ultimately set—if and when this does not or cannot occur in the scope of a self-test.

It has already been described that magneto-inductive flowmeters are known in which the user can directly and immediately activate a self-test, i.e., even in the correspondingly equipped magneto-inductive flowmeter,—with the result that after carrying out the self-test, parameterizations resulting therefrom are carried out by the correspondingly equipped magneto-inductive flowmeter itself.

In the magneto-inductive flowmeter according to the invention, it is naturally possible to implement what is already part of the prior art in respect to self-tests and, what was previously described in the teaching of the present invention can also be additionally implemented.

The possibilities described above in detail for carrying out parameterization and/or for providing application classification, can also be carried out in-part manually and in-part according to the invention.

Initially and essentially, the possibility of communication between the user or the flowmeter itself and a third party as described in detail is part of the magneto-inductive flowmeter according to the invention, wherein, as repeatedly described, the third party can be, for example, the producer of the flowmeter or a service site of the producer, however the third party can also and above all be an "assistance function" implemented by the producer or even implemented in the software of the flowmeter itself. This communication can be implemented in that the request initiator, the contacting receiver and/or the information sender is/are designed in a wireless manner. The current prior art for communication of this kind, however, often uses bus connections. Consequently, a preferred embodiment of the magneto-inductive flowmeter according to the invention is—alternatively or cumulatively—wherein the request initiator, the contacting receiver and/or the information sender has/have a communication interface for a bus connection, for example a "HART" interface, a "profibus" interface, a "foundation field bus" interface and/or a "modebus" interface. Wireless communication or communication with the help of a bus connection is then naturally omitted if everything that is implemented according to the invention is found within the flowmeter itself—as described in detail above.

In detail, there are a number of possibilities for designing and further developing the magneto-inductive flowmeter according to the invention and the method according to the invention for operating a magneto-inductive flowmeter as will become apparent form the following description of preferred embodiments in conjunction with the accompanying drawings.

DETAILED DESCRIPTION OF THE INVENTION

Figure 1:
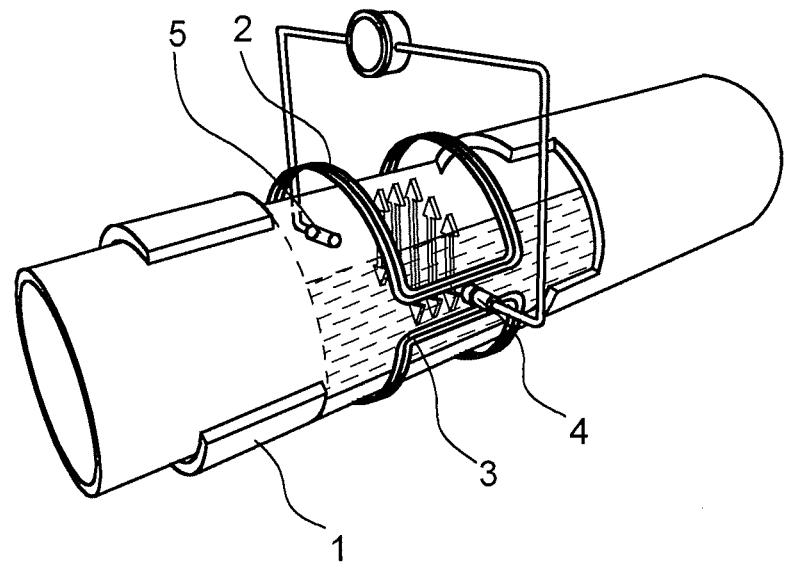
FIG. 1 is a perspective view that schematically shows a basic construction of a magneto-inductive flowmeter, FIG. 2 schematically shows a functional unit containing an evaluation unit, a request initiator, a contacting receiver, an information sender, a self-test unit, a parameter-setting unit, and a communication interface.

In FIG. 1, the magneto-inductive flowmeter is shown only schematically, in its basic construction being comprised of a measuring tube 1 for the flow of an electrically conductive medium, a magnetic field generator for generating an alternating magnetic field running at least partially perpendicular to the longitudinal axis of the measuring tube 1, with two magnetic field coils 2, 3 in the illustrated embodiment, two measuring electrodes 4, 5, preferably in contact with the medium and of components not shown in FIG. 1, namely a functional unit 6 containing at least one evaluation unit 7, a request initiator 8, a contacting receiver 9, an information sender 10, a self-test unit 11, a parameter-setting unit 12, and a communication interface 13.

Figure 2:
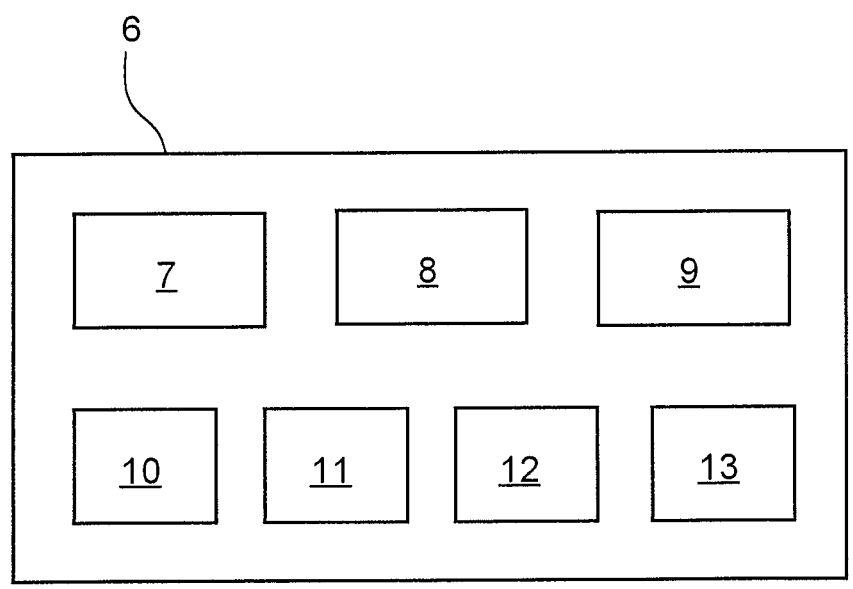

In FIG. 2. there is shown schematically the functional unit belonging to the magneto-inductive flowmeter in FIG. 1, this functional unit 6 containing at least one evaluation unit 7, a request initiator 8, a contacting receiver 9, an information sender 10, a self-test unit 11, a parameter-setting unit 12, and a communication interface 13.

Operation of the flowmeter and functional thereof is as described above in the Summary of the Invention.

What is claimed is:

1. Magneto-inductive flowmeter, comprising:
   at least one measuring tube for a flow of an electrically conducting medium,
   at least one magnetic field generator for generating a magnetic field running perpendicular to a longitudinal axis of the measuring tube, at least two measuring electrodes in contact with the flow of an electrically conducting medium, and a functional unit containing at least one evaluation unit, wherein the functional unit has a request initiator that is activatable by either a user or the flowmeter itself, a contacting receiver and an information sender and the request initiator enabling a third party to be prompted by the user or enabling the flowmeter itself to be prompted by the user to take at least one indicated action relative to the flowmeter.

2. Magneto-inductive flowmeter according to claim 1, wherein the functional unit has a self-test unit and a parameter-setting unit and wherein the at least one indicated action is for the third party to activate the self-test unit and to confirm contact to the user.

3. Magneto-inductive flowmeter according to claim 1, wherein the functional unit has a self-test unit and a parameter-setting unit and that the self-test unit is able to independently carry out parameterization.

4. Magneto-inductive flowmeter according to claim 1, wherein the at least one indicated action is for the third party to confirm contact to the user, and after the third party confirms contact, an ability to request an exchange of information is enabled and wherein, after a request for exchange of information coming from the third party, the user or the flowmeter is able to modify operation of the magneto-inductive flowmeter or the data produced thereby.

5. Magneto-inductive flowmeter according to claim 1, wherein at least one of the request initiator, the contacting receiver and the information sender is constructed to transmit or receive wirelessly.

6. Magneto-inductive flowmeter according to claim 1, wherein at least one of the request initiator, the contacting receiver and the information sender has a communication interface for a bus connection.

7. Method of operating a magneto-inductive flowmeter, comprising the steps of:

directing a flow of an electrically conducting medium through at least one measuring tube, using at least one magnetic field generator to generate a magnetic field running perpendicular to a longitudinal axis of the measuring tube, using at least two measuring electrodes in contact with the flow of an electrically conducting medium to detect properties of the medium flowing through the at least one measuring tube, and evaluating detected properties with a functional unit having at least one evaluation unit, activating a request initiator, a contacting receiver and an information sender of the functional unit by either a user or the flowmeter itself to prompt a third party to take at least one indicated action relative to the flowmeter, after a request for contact coming from the user or the flowmeter itself, the third party confirms contact and enables the user or the flowmeter itself to request exchange of information and after a request for exchange of information coming from the third party, the user or the flowmeter itself, influencing operation of the magneto-inductive flowmeter or the data produced thereby.

8. Method according to claim 7, wherein the at least one indicated action is for the third party to activate a self-test unit and to confirm contact to the user.

* * * * *